United States Patent
Santan et al.

(10) Patent No.: US 8,691,331 B2
(45) Date of Patent: Apr. 8, 2014

(54) SURFACE MODIFICATION OF HYDROPHOBIC AND/OR OLEOPHOBIC COATINGS

(76) Inventors: Prashant D. Santan, San Diego, CA (US); Newton Michael Tarleton, Vista, CA (US)

(*) Notice: Subject to any disclaimer, the term of this patent is extended or adjusted under 35 U.S.C. 154(b) by 1404 days.

(21) Appl. No.: 12/322,930

(22) Filed: Feb. 9, 2009

(65) Prior Publication Data

US 2010/0201940 A1  Aug. 12, 2010

(51) Int. Cl.
B05D 7/24 (2006.01)

(52) U.S. Cl.
USPC .......................................... 427/164; 427/165

(58) Field of Classification Search
USPC .................................. 427/164, 165
See application file for complete search history.

(56) References Cited

U.S. PATENT DOCUMENTS

| | | | |
|---|---|---|---|
| 4,217,038 A | 8/1980 | Letter et al. | |
| 4,338,420 A | 7/1982 | Arbit | |
| 4,478,873 A | 10/1984 | Masso et al. | |
| 4,590,117 A | 5/1986 | Taniguchi et al. | |
| 4,740,282 A | 4/1988 | Gesser et al. | |
| 5,344,462 A | 9/1994 | Paskalov et al. | |
| 5,573,715 A | 11/1996 | Adams et al. | |
| 5,783,641 A | 7/1998 | Koh et al. | |
| 6,281,468 B1 | 8/2001 | Souel et al. | |
| 6,379,746 B1 | 4/2002 | Birch et al. | |
| 6,550,915 B1 | 4/2003 | Grobe, III | |
| 6,887,402 B2 | 5/2005 | Klemm et al. | |
| 6,991,826 B2 | 1/2006 | Pellerite et al. | |
| 7,175,878 B2 | 2/2007 | Helmstetter et al. | |
| 7,217,440 B2 | 5/2007 | Jallouli et al. | |
| 7,371,992 B2 | 5/2008 | Carr | |
| 7,838,068 B2 * | 11/2010 | Lacan et al. | 427/154 |
| 2002/0008847 A1 * | 1/2002 | Ayoub | 351/174 |
| 2003/0049370 A1 | 3/2003 | Lacan et al. | |
| 2004/0173580 A1 | 9/2004 | Carr | |
| 2005/0115923 A1 | 6/2005 | Lacan et al. | |
| 2005/0208212 A1 | 9/2005 | Jallouli et al. | |
| 2006/0051501 A1 | 3/2006 | Conte et al. | |
| 2008/0038483 A1 | 2/2008 | Goetz et al. | |
| 2008/0062381 A1 | 3/2008 | Doshi et al. | |
| 2008/0180781 A1 * | 7/2008 | Varaprasad et al. | 359/267 |

* cited by examiner

*Primary Examiner* — Jie Yang
(74) *Attorney, Agent, or Firm* — Ice Miller LLP

(57) ABSTRACT

A hydrophobic and/or oleophobic coating system having a reversibly reduced hydrophobicity. A hydrophobic and/or oleophobic coating is applied to and is bonded or otherwise strongly adhered to a substrate, such as an optical lens. The coating has sufficient thickness to provide a weakly adhered, excess portion that is mechanically removable. The excess portion of the hydrophobic and/or oleophobic coating has a surface that is modified to reduce hydrophobicity, such as by ion bombardment. The hydrophobicity of the coating is restored by mechanical removal of the excess portion of the coating.

15 Claims, 2 Drawing Sheets

SURFACE MODIFICATION OF HYDROPHOBIC AND/OR OLEOPHOBIC COATINGS

BACKGROUND OF THE INVENTION

The present invention relates to methods for modifying the surface of hydrophobic and/or oleophobic coatings and, in particular, to surface modification of hydrophobic and/or oleophobic coatings on ophthalmic lenses.

Ophthalmic lenses are commonly provided with coatings that impart improvements to lens performance, such as scratch resistance, anti-reflection, anti-static, and other properties. It is also common to apply more than one of these coatings to the lens to provide some combination of improvements in performance characteristics. A final anti-soiling coating is often applied on top of these other coatings, and has hydrophobic and/or oleophobic properties to protect the inner coatings from moisture and to improve the ease of cleaning the surface of the lens. Generally, the hydrophobic and/or oleophobic coating is comprised of compounds, such as fluorinated compounds, that exhibit relatively high water wetting angles, generally in excess of 90 degrees. Typically, such hydrophobic and/or oleophobic coatings also reduce friction and create a slippery or slick surface on the lens.

Most, but not all, manufacturers of ophthalmic lenses apply anti-reflective and/or anti-static and/or anti-soiling and/or hydrophobic and/or oleophobic layers after surfacing the lenses to meet a particular prescription requirement or after applying a scratch resistant coating to the lenses. The final stages of lens processing often include the application of a stamped layout ink mark on the surface of lens, which provides information regarding, among other things, the fitting position and optical orientation, including the horizontal reference axis of the lens. This information is required for the proper grinding or edging of the lens to the final shape needed to fit the lens into a chosen frame and have it in proper optical alignment for the patient.

The ink marking operation is commonly performed using the "pad printing" method. The lens is first oriented and held in position on the marking platform. This alignment is essential to assure that the ink marking is applied in the correct position to reflect the optical orientation of the lens. Layout marking ink is transferred from an inked marking plate by means of a soft rubber pad, such as a silicone pad, and subsequently applied to the lens. Once the lens is marked for layout, the lens is checked for ophthalmic properties and/or prepared for the edging operation.

The ink markings are used for proper alignment of the lens during the edging operation. Typically, an edging pad having an adhesive on both sides is placed on the front surface of lens so one side of the pad adheres to the lens surface and the second side adheres to an edging block that is properly aligned to maintain lens orientation during the edging process. The assembly consisting of the lens, edging pad and edging block, is then placed in the edging machine chuck assembly, and the lens is held between sections of the lens holding spindle of the edging machine. The lens orientation is maintained by the block which must stay in firm contact with the lens surface during the edging operation.

The lens is edged by rotating the lens through controlled rotation of the spindle of the edging machine. One method of edging utilizes a diamond impregnated wheel, also rotating with a controlled speed, that contacts the edge of the lens, grinding the lens in order to reduce the diameter of the lens. The lens is edged according to frame shape and optical orientation, and can be subsequently finished with an edge groove or drilled with mounting holes, depending on frame type and shape.

The optical performance of a lens depends on how accurately the lens is fitted into the frame. In order to achieve the proper fitting, it is essential that the lens is clearly and accurately stamped, and does not slip during the edging operation. However, the hydrophobic and/or oleophobic coatings often make the lens surface slick or slippery. Furthermore, it is very common to make the surface of lenses as slippery as possible to enhance cleaning. This slippery coating can reduce the adhesion and coverage of the ink stamped on the front surface of the lenses, and also can reduce adhesion of edging pads to the lens surface resulting in slippage of the lenses during the edging operation.

To achieve accurate and complete ink markings on the lens surface used for layout and to edge the lenses more accurately, it is desirable to modify the surface properties of the hydrophobic and/or oleophobic coating to enhance the ability to stamp the lens surface and to reduce slippage during the edging process, while still providing good lens cleaning properties and protection of the inner anti-reflective coating layers and/or other coating layers on the lens.

SUMMARY OF THE INVENTION

Hydrophobic and/or oleophobic coating systems having reversibly reduced hydrophobicity are disclosed, comprising a hydrophobic and/or oleophobic coating that is adhered to the substrate, the hydrophobic and/or oleophobic coating having a thickness sufficient to provide an excess portion of the coating that is mechanically removable from the substrate. The excess portion of the coating has a surface that is modified to reduce hydrophobicity. In a preferred embodiment, the surface is modified by ion bombardment.

In addition, methods of making ophthalmic lenses having a hydrophobic and/or oleophobic coatings with reversibly reduced hydrophobicity are disclosed, comprising the steps of applying a hydrophobic and/or oleophobic coating to an optical lens. The hydrophobic and/or oleophobic coating is adhered to the optical lens and has a thickness sufficient to provide an excess portion of the coating that is mechanically removable from the optical lens, the excess portion of the coating having a surface. The surface is preferably modified by ion bombardment to reduce hydrophobicity.

DETAILED DESCRIPTION OF THE INVENTION

Figure 1:
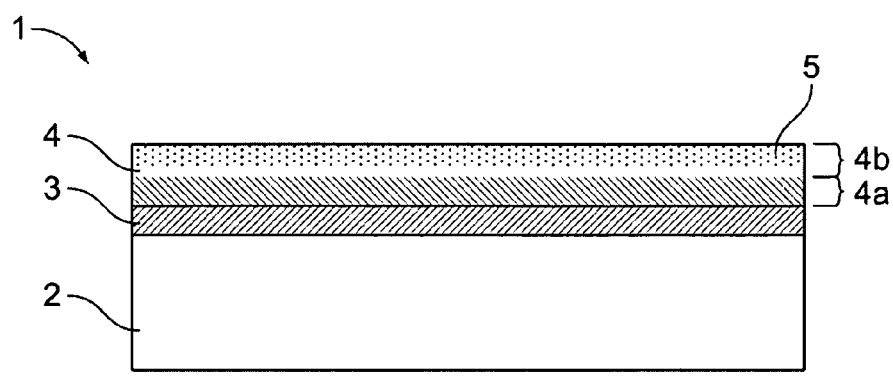
FIG. 1 is a side section view representation of an optical lens having a hydrophobic and/or oleophobic coating that has a surface modified by ion bombardment.

Ophthalmic lenses are often manufactured with a hydrophobic and/or oleophobic coating that is applied to the surface of the lens by a variety of means known in the art, including vacuum deposition. The hydrophobic and/or oleophobic coating is typically applied on top of other coatings, including anti-reflective coatings and/or other coatings known in the art.

Such hydrophobic and/or oleophobic coatings commonly comprise fluorinated compounds, such as fluorinated siloxanes, fluorinated silanes, fluorinated silanols and/or fluorocarbons. The hydrophobic and/or oleophobic coatings bond with or are otherwise strongly adhered to the underlying substrate, such that they are generally not removable by wiping with solvents or similar mechanical means. Not wishing to be bound by any particular theory, it is believed that the fluorinated compounds of the hydrophobic and/or oleophobic coatings adhere to the substrate through chemical bonds—e.g. through hydrogen bonds with the silicon dioxide of an anti-reflective coating, or other suitable interaction depending on the substrate and specific hydrophobic and/or oleophobic coating.

We have found that the hydrophobicity of the hydrophobic and/or oleophobic coating increases as the thickness of the coating is increased. However, there is a point where, as the thickness of the hydrophobic and/or oleophobic coating increases beyond a certain value, the hydrophobicity of the coating remains essentially constant.

The hydrophobicity of the hydrophobic and/or oleophobic coating may be measured by the water contact angle of the surface of the coating. The contact angle may be described as the angle formed between a tangential line on a water drop and the coating surface the drop contacts. The tangential line is drawn at a point where the drop's outer surface contacts the coating surface. For example, a perfectly spherical drop of water on a surface would rest at a single point on the surface and have a contact angle of 180 degrees.

Table 1 shows the water contact angle of a hydrophobic and/or oleophobic coating as a function of coating thickness. The hydrophobic and/or oleophobic coating is Super Clean Coat (Leybold Optics USA—Cary, N.C.), and is applied by vacuum deposition using a BOXER or SYRUS coating system (Leybold Optics) provided with a Super Clean Coat Pill Type A 1.1, Diameter 12 mm×4 mm. The thickness of the coating is determined by the BOXER or SYRUS coating system using an internal piezoelectric crystal, as is known in the art. As the thickness of the hydrophobic and/or oleophobic coating increases, the water contact angle on surface increases. However, there is no further noticeable increase in water contact angle on surface of the hydrophobic and/or oleophobic coating after a thickness of about 10-15 nm is achieved.

TABLE 1

Surface Hydrophobicity

| Coating Thickness | Water Contact Angle |
|---|---|
| 3 nm | 96° |
| 5 nm | 102° |
| 7 nm | 106° |
| 10 nm | 113° |
| 15 nm | 116° |
| 20 nm | 116° |
| 25 nm | 115° |
| 30 nm | 115° |

In addition, we have found that the thickness of the oleophobic and/or hydrophobic coating that is bonded or strongly adhered to the substrate is finite. A thickness that is greater than that which strongly adheres to the substrate results in an excess portion of the hydrophobic and/or oleophobic coating that is weakly adhered to the portion of the hydrophobic and/or oleophobic coating below it that is strongly adhered to the substrate. This weakly adhered portion is readily removed by mechanical action and by using solvents.

In the case of the Super Clean Coat (Leybold Optics) hydrophobic and oleophobic coating, we have found that the portion of the coating that is strongly adhered to the substrate has a maximum thickness of approximately 10-15 nm. Coatings having a thickness greater than about 10 nm, and preferably at least about 20 nm, resulted in a weakly adhered, excess portion of the coating that was readily removable by wiping and by the use of solvents such as isopropyl alcohol, methanol, ethanol and/or acetone. Furthermore, as shown above, the removal of this excess portion results in little or no reduction in the hydrophobicity of the hydrophobic and/or oleophobic coating.

These properties of the hydrophobic and/or oleophobic coating can be used to provide a coating having reversibly reduced hydrophobicity.

It has been found that the outer surface of the hydrophobic and/or oleophobic coating can be modified to lower the water contact angle and reduce the slipperiness of the coating. This modification of the coating surface increases the accuracy of ink marking and edging. In a preferred embodiment, the surface of the hydrophobic and/or oleophobic coating is modified by ion bombardment. Exposure to high energy ions has been shown to compromise the oleophobic and hydrophobic properties of top coatings used in the manufacturing of thin film coatings, including anti-reflective coatings. Experimentation has demonstrated that the depth and extent of this change is related to both the energy and duration of the exposure to the beam. Control of the energy and duration of the beam provides a mechanism to control the penetration of modification into the topcoat and allows modification of the oleophobic and/or hydrophobic properties in a consistent, predicable manner.

If the hydrophobic and/or oleophobic coating is sufficiently thick to provide a weakly adhered, excess portion of the coating, the modification of the coating surface can be limited to this excess portion of the coating. Once the lens has been ink marked and/or edged, the hydrophobicity of the hydrophobic and/or oleophobic coating can be restored by mechanically removing the excess portion of the coating which includes the modified surface.

Figure 2:
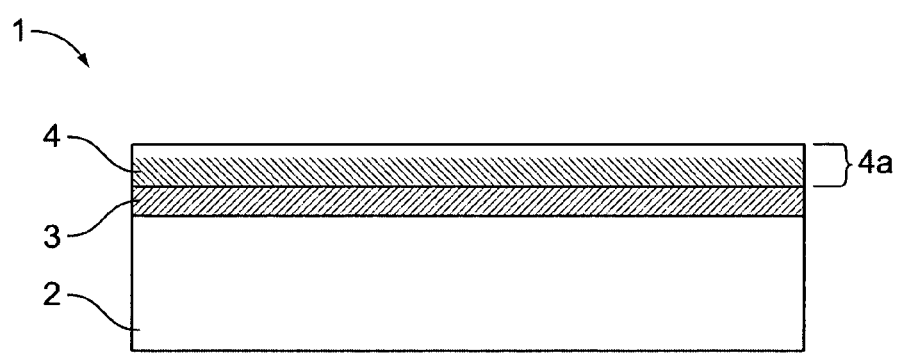
FIG. 2 is a side section view representation of the optical lens of FIG. 1, after the modified surface has been mechanically removed from the lens.

Referring to FIGS. 1 and 2, an embodiment of a hydrophobic and/or oleophobic coating system having reversibly reduced hydrophobicity is shown. An ophthalmic lens 1 comprises an optical lens 2, that has an anti-reflective or other coating 3, and a final hydrophobic and/or oleophobic coating 4. As shown in FIG. 1, the hydrophobic and/or oleophobic coating is sufficiently thick that there is a portion 4a of the coating that is bonded or strongly adhered to the underlying anti-reflective coating 3, and a weakly adhered, excess portion 4b of the coating that is mechanically removable. Modification of the hydrophobic and/or oleophobic coating 4 by ion bombardment produces an outer surface 5 of portion 4b of the coating that has reduced hydrophobicity and slipperiness. Other methods of modifying the surface of the oleophobic and/or hydrophobic coating may be used, including atmospheric plasma, electron beam, and other methods that are known in the art. After ink marking, edging and/or other finishing steps, portion 4b and modified surface 5 of hydrophobic and/or oleophobic coating 4 can be mechanically removed to restore the hydrophobicity of the coating, as shown in FIG. 2.

The following examples demonstrate preferred embodiments of the invention. Those of skill in the art will appreciate that changes may be made in the specific embodiments disclosed in the examples and a like or similar result may still be obtained without departing from the scope of the invention.

Example 1

Preparation of Ophthalmic Lenses Having Hydrophobic and/or Oleophobic Coatings

Ophthalmic lenses having a hydrophobic and/or oleophobic coating were prepared for modification by ion bombardment and testing. The lenses were provided as finished lenses having a front surface with a radius of curvature between 106 mm and 82 mm and a total through power of −2.00 D Spherical. Four different types of commercially available lens materials were used: CR-39@ (PPG Industries, Inc.—Pittsburgh, Pa.), 1.56 EvoClear® (Signet Armorlite, Inc.—San Marcos, Calif.), polycarbonate, and 1.67 index. The lenses were prepared using two different methods—Method A and B.

In Method A, the front side of the lenses received an anti-reflective coating and then a final hydrophobic and/or oleophobic coating. The lenses were first spincoated on the back side with a commercially available UV curable, scratch resistant coating and then degassed for at least 1 hr at 45° C. An anti-reflective coating and then a final hydrophobic and oleophobic coating were then applied by vacuum deposition using either a BOXER or SYRUS coating system (Leybold Optics USA—Cary, N.C.). The hydrophobic and/or oleophobic coating was Super Clean Coat (Leybold Optics), applied by providing the BOXER or SYRUS coating system with a Super Clean Coat Pill Type A 1.1, Diameter 12 mm×4 mm. The coating was applied in a thickness of 30 nm as measured by the BOXER or SYRUS coating system.

In Method B, the front side of the lenses received a polysiloxane coating, an anti-reflective coating, and then a final hydrophobic and oleophobic coating. The lenses were first dip coated with a commercially available polysiloxane coating, cured according to the manufacturers' recommendation and then degassed for at least 1 hour at 45° C. The lenses were then coated with an anti-reflective coating and a hydrophobic and oleophobic coating as described for Method A.

Example 2

Surface Modification of the Hydrophobic and Oleophobic Coating by High Energy Ion Bombardment The hydrophobic and oleophobic coatings of lenses prepared as described in Example 1 using Method A and Method B, and were modified by exposure to relatively high energy ions for varying lengths of time. The lenses were then tested for their performance in ink marking and edging, the reduction in hydrophobicity of the hydrophobic and oleophobic coating, and the ability to restore the hydrophobicity of the coating.

The hydrophobic and oleophobic coatings were modified by ion bombardment using the same BOXER or SYRUS coating system used to apply the coatings to the lenses, with the following voltage and current settings: Anode 100 Volts, 0.80 Amps and Cathode 17 Amps. The lenses were exposed to ion bombardment for either 1, 3, 5, 10 or 15 seconds. After modification by ion bombardment, lens samples were tested for: ink marking integrity, beading of ink on the surface of the lens, water contact angle before and after removal of the excess portion of the hydrophobic and oleophobic coating ("cleaning"), and slippage of the lens during edging. The results of the testing is shown in Table 2. Each sample tested consisted of a total of eight lenses—a CR-39®, 1.56 EvoClear®, polycarbonate, and 1.67 index lens prepared by both Method A and by Method B. The results obtained for each lens in the sample were averaged and recorded.

Figure 3:
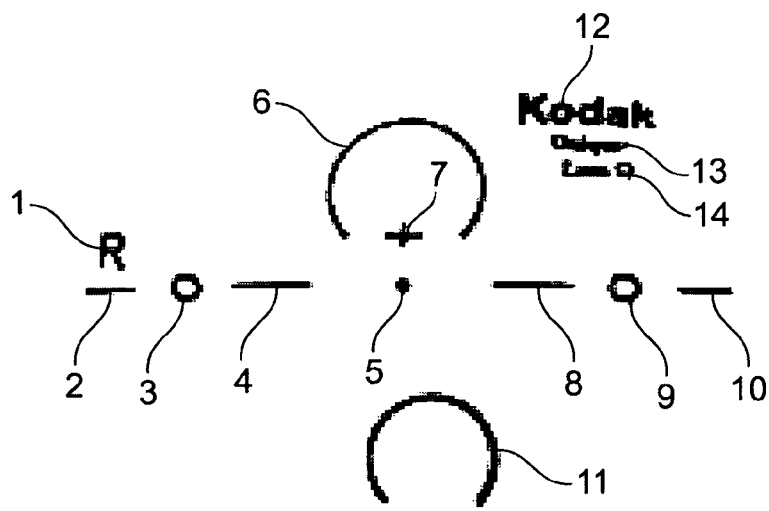
FIG. 3 is an embodiment of stamped layout ink mark that may be applied to the surface of a lens.
Figure 4:
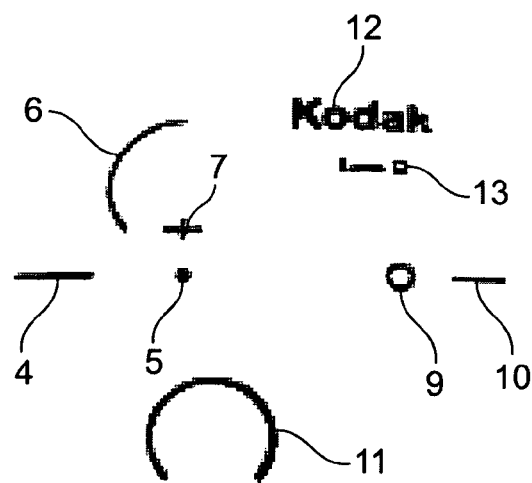
FIG. 4 is a representation of an incomplete, partial transfer of the stamped layout ink of FIG. 3.

Ink marking was tested by stamping the front side of the lens with a layout ink mark using a RobCtrl marking system (A&R Optical Machinery Inc.—Brookfield, Wis.). The complete layout ink mark comprised fourteen elements 1-14, as illustrated in FIG. 3. The percentage of the layout ink mark transferred to the surface of the lens was visually determined and calculated as the number of elements actually transferred to the lens divided by the total number of elements. A representation of an incompletely transferred layout ink mark is illustrated in FIG. 4, that has only eight visible elements, of which six elements (4, 5, 7, 9, 10, 11, 13) are complete, and two have only ½ of the element (6, 12) visible. The percentage of the layout ink mark transferred is calculated as [6+(2× ½)]/14=57%. A transfer of less than 80% is generally undesirable.

Ink beading was visually evaluated by judging the appearance of a 1-inch mark made on the front side of the lens using a Sharpie® marker (Sanford Corp.—Oak Brook, Ill.). Marks where more than 80% of the mark shows no beading were deemed to produce a solid ink mark ("+"), and marks where less than 80% of the mark shows no beading were deemed to have unsatisfactory beading ("—"). Samples where the individual lenses produced mixed results are indicated by "−".

The water contact angle of the front side of the lenses was measured using a VCA OPTIMA™ Surface Analysis System (AST Products, Inc.—Billerica, Mass.), dispensing a 1.50 μl water droplet near the center of the lens. Water contact angle measurements were taken within 10 seconds of first surface contact with the droplet. The water contact angle for each lens in the sample was determined as the average of two separate measurements.

The water contact angle of each sample was determined both before and after removal ("cleaning") of the modified outer surface of the hydrophobic and oleophobic coating. The lenses were cleaned by manually wiping the front side of the lens 2-3 times with a soft cleaning cloth wetted with methanol using moderate pressure to mechanically remove the weakly adhering, excess portion of the hydrophobic and oleophobic coating. The cleaned lenses were then wiped with a dry cloth before measuring the water contact angle. Alternative methods of cleaning may be used, including manually washing the lens with a sponge and soapy water.

Slippage of the lens during edging was measured by engraving the front side of the lens with a straight line passing through the center of the lens, which defines the 0-180 axis of the lens. The engraved lenses were then loaded into a Essilor Kappa edging system (Essilor of America Inc.—Dallas, Tex.) as described above, and then edged to a diamond shape with the 0-180 axis connecting the right and left vertices of the diamond. If slippage of the lens occurs during edging, the 0-180 axis will be offset from the right and left vertices of the diamond shape. The edged lens is placed on a measuring circle or protractor and the angle of offset of the 0-180 axis is determined and recorded. Slippage of about 2° or less is preferred and slippage greater than about 5° is generally undesirable.

TABLE 2

Example 1 - Modified Surface Characteristics

| Sample | Exposure (sec) | Stamp Transfer | Beading | Contact Angle Before Cleaning | Contact Angle After Cleaning | Slippage |
|---|---|---|---|---|---|---|
| 1 | 1 | 30% | -- | 115° | 115° | 25° |
| 2 | 3 | 50% | -- | 110° | 114° | 18° |
| 3 | 5 | 80% | - | 105° | 114° | 5° |
| 4 | 10 | 90% | + | 93° | 105° | 2° |
| 5 | 15 | 98% | + | 84° | 98° | 1° |

Samples 1 and 2 performed poorly, exhibiting little reduction in water contact angle before cleaning and having unacceptable stamp transfer, beading and slippage. Sample 3 exhibited a significant reduction in water contact angle before cleaning and good restoration of hydrophobicity after cleaning, but performed marginally in stamp transfer, beading and slippage. Sample 4 exhibited a good reduction in water contact angle before cleaning and reasonable restoration of hydrophobicity after cleaning, and performed well in stamp transfer, beading and slippage. Sample 5 also exhibited good reduction in water contact angle before cleaning and performed well in stamp transfer, beading and slippage, but exhibited poor restoration of hydrophobicity after cleaning. These data demonstrate that a modified hydrophobic and/or oleophobic coating that reduces the water contact angle to about 105° or less produces acceptable results, provided that the intensity of exposure to ion bombardment does not significantly degrade the ability to restore hydrophobicity after cleaning.

Example 3

Surface Modification of the Hydrophobic and Oleophobic Coating by Low Energy Ion Bombardment The preparation and testing of hydrophobic and oleophobic coatings of lenses modified by ion bombardment was conducted in the same manner as described in Example, except that the voltage and current settings were: Anode 60 V, 0.25 A and Cathode 16.25 A. In addition, the lenses were exposed to ion bombardment for either 1, 3, 5, 10, 15, 20, 25, 30, 35 and 40 seconds. The results of the testing is shown in Table 3.

TABLE 3

Example 2 - Modified Surface Characteristics

| Sample | Exposure (sec) | Stamp Transfer | Beading | Contact Angle Before Cleaning | Contact Angle After Cleaning | Slippage |
|---|---|---|---|---|---|---|
| 6 | 1 | 20% | -- | 114° | 114° | 20° |
| 7 | 3 | 20% | -- | 115° | 115° | 18° |
| 8 | 5 | 30% | -- | 114° | 114° | 24° |
| 9 | 10 | 40% | -- | 113° | 116° | 20° |
| 10 | 15 | 60% | -- | 114° | 115° | 18° |
| 11 | 20 | 70% | - | 108° | 114° | 5° |
| 12 | 25 | 90% | + | 101° | 116° | 2° |
| 13 | 30 | 90% | + | 96° | 114° | 2° |
| 14 | 35 | 95% | + | 85° | 93° | 1° |
| 15 | 40 | 95% | + | 82° | 89° | 1° |

Samples 6-10 performed poorly, exhibiting little reduction in water contact angle before cleaning and having unacceptable stamp transfer, beading and slippage. Sample 11 exhibited a significant reduction in water contact angle before cleaning and good restoration of hydrophobicity after cleaning, but performed marginally in stamp transfer, beading and slippage. Samples 12 and 13 exhibited good reduction in water contact angle before cleaning and good restoration of hydrophobicity after cleaning, and performed well in stamp transfer, beading and slippage. Samples 14 and 15 also exhibited good reduction in water contact angle before cleaning and performed well in stamp transfer, beading and slippage, but exhibited poor restoration of hydrophobicity after cleaning. These data demonstrate that a modified hydrophobic and/or oleophobic coating that reduces the water contact angle to about 110° or less, and more preferably about 100° or less, produces acceptable results, provided that the intensity of exposure to ion bombardment does not significantly degrade the ability to restore hydrophobicity after cleaning.

Although the invention has been described in detail with reference to preferred embodiments, variations and modifications exist within the scope and spirit of the invention as described and defined in the following claims. In particular, those of skill in the art will appreciate that the thickness at which the water contact angle no longer increases will vary as a function of the formulation and structure of the hydrophobic and/or oleophobic coating composition. Similarly, the thickness of the oleophobic and/or hydrophobic coating that strongly adheres to the substrate will also vary as a function of formulation and structure of the coating. Furthermore, the invention is not limited in application to any particular type or form of lens, and may include finished or semi-finished lenses made of any of the various materials known in the art.

What is claimed is:

1. A method for making an ophthalmic lens having a hydrophobic and/or oleophobic coating with reversibly reduced hydrophobicity, comprising the steps of:
   providing an optical lens;
   applying a hydrophobic and/or oleophobic coating to the optical lens, the hydrophobic and/or oleophobic coating adhered to the optical lens and having a thickness greater than about 10 nm and having an excess portion of the coating that is mechanically removable from the optical lens, the excess portion of the coating having a surface; and
   modifying the surface by ion bombardment to reduce hydrophobicity.

2. The method of claim 1, wherein the hydrophobic and/or oleophobic coating is applied in a thickness of at least about 20 nm.

3. The method of claim 1, wherein the hydrophobic and/or oleophobic coating is applied in a thickness of about 30 nm.

4. The method of claim 1, wherein the surface is modified to reduce hydrophobicity to a water contact angle of about 110 degrees or less.

5. The method of claim 1, wherein the surface is modified to reduce hydrophobicity to a water contact angle of about 105 degrees or less.

6. The method of claim 1, wherein the surface is modified to reduce hydrophobicity to a water contact angle of about 100 degrees or less.

7. The method of claim 1, wherein the optical lens has an anti-reflective coating and the hydrophobic and/or oleophobic coating is adhered to the anti-reflective coating.

8. The method of claim 1, further comprising the steps of:
   ink marking the modified surface; and
   mechanically removing the modified surface.

9. The method of claim 8, wherein the modified surface is mechanically removed using a solvent.

10. The method of claim 9, wherein the solvent is selected from the group consisting of: isopropyl alcohol, methanol, ethanol, acetone and combinations thereof.

11. The method of claim 1, further comprising the steps of:
   edging the optical lens; and
   mechanically removing the modified surface.

12. The method of claim 11, wherein the modified surface is mechanically removed using a solvent.

13. The method of claim 12, wherein the solvent is selected from the group consisting of: isopropyl alcohol, methanol, ethanol, acetone and combinations thereof.

14. A method for making an article having a hydrophobic and/or oleophobic coating with reversibly reduced hydrophobicity, comprising the steps of:
   providing a substrate;
   applying a hydrophobic and/or oleophobic coating to the substrate, the hydrophobic and/or oleophobic coating adhered to the substrate and having a thickness greater than about 10 nm and having an excess portion of the coating that is mechanically removable from the substrate, the excess portion of the coating having a surface; and
   modifying the surface to reduce hydrophobicity by treatment with high energy charged particles.

15. The method of claim 14, wherein the treatment with high energy charged particles is selected from the group consisting of: ion bombardment, atmospheric plasma and electron beam.

* * * * *